United States Patent [19]
Enright et al.

[11] Patent Number: 6,132,918
[45] Date of Patent: Oct. 17, 2000

[54] POLYMERS AND PROCESSES THEREOF

[75] Inventors: Thomas E. Enright; George Liebermann, both of Mississauga, Canada; Scott M. Silence, Fairport; K. Derek Henderson, Rochester, both of N.Y.; Hadi K. Mahabadi, Etobicoke, Canada; Bernard A. Kelly, Ontario, N.Y.

[73] Assignee: Xerox Corporation, Stamford, Conn.

[21] Appl. No.: 09/537,272

[22] Filed: Mar. 29, 2000

Related U.S. Application Data

[62] Division of application No. 09/017,394, Feb. 2, 1998.
[51] Int. Cl.$^7$ ...................................................... G03G 9/113
[52] U.S. Cl. ............................................ 430/108; 430/137
[58] Field of Search ...................................... 430/108, 137

[56] References Cited

U.S. PATENT DOCUMENTS

| | | | |
|---|---|---|---|
| 6,010,812 | 1/2000 | Barbetta et al. | 430/108 |
| 6,051,353 | 4/2000 | Hoffend et al. | 430/108 |

*Primary Examiner*—John Goodrow
*Attorney, Agent, or Firm*—E. O. Palazzo

[57] ABSTRACT

A process for the preparation of polymers which comprises generating a solution of water and polyvinyl alcohol with acetate groups; adding thereto a mixture of an alkali metal iodide and iodine; adding thereto initiator, and optional crosslinking agent; adding monomer, a mixture of monomers, or a monomer/polymer mixture; homogenizing, and polymerizing; and wherein there is formed an iodide/iodine/acetate complex prior to said polymerizing.

14 Claims, No Drawings

POLYMERS AND PROCESSES THEREOF

This application is a divisional of application(s) Ser. No(s). 09/017,394, filed Feb. 2, 1998.

BACKGROUND OF THE INVENTION

This invention is generally directed to polymers and processes for the preparation thereof. The process of the present invention in embodiments relates to the preparation of a polymer, which polymer can be selected as a carrier powder coating, and more specifically a process for the preparation of polymeric particles with for example, a volume average particle size diameter of from about 0.05 micron to about 5 microns, and preferably from about 1 to about 5 microns in volume average diameter, as determined for example by known methods, such as a Coulter Counter. In embodiments the present invention also relates to developer compositions comprised of carrier particles coated with a continuous, or semicontinuous layer of a polymer prepared by the processes illustrated herein.

More specifically the present invention is directed to processes for the preparation of polymers wherein there is formed a complex between for example, polyvinyl acetate, iodine, and iodide, and there is eliminated, or minimized, undesirable foaming and fouling of the reactors selected, thereby enabling the process to be very useful on a large manufacturing scale. The carrier particles containing the polymer generated as illustrated herein, and a second polymer, such as polyvinylidene fluoride, or enable a wide carrier triboelectric range. Developer compositions comprised of the carrier particles illustrated herein and prepared, for example, by a dry coating process are useful in electrostatographic or electrophotographic imaging systems, especially xerographic imaging, digital imaging, and printing, inclusive of color printing processes. Furthermore, in the aforementioned imaging systems the triboelectric charge on the carrier particles can be preselected depending on for example, the polymer composition and dispersant component applied to the carrier core.

With the carrier compositions and process of the present invention there can be formulated developers with selected triboelectric charging characteristics and/or conductivity values in a number of different combinations. Thus, for example, there can be formulated in accordance with the invention of the present application developers with conductivities of from about $10^{-6}$ ohm-cm to about $10^{-17}$ ohm-cm, and preferably from about $10^{-8}$ ohm-cm to about $10^{-6}$ ohm-cm, which conductivities are determined in a magnetic brush conducting cell, and a wide carrier triboelectric charging value of from about −30 to about +70, and in embodiments of from about −15 to about +20 microcoulombs per gram on the carrier particles as determined by the known Faraday Cage method. Thus, developers can be formulated with constant conductivity values with different triboelectric charging characteristics, or with constant triboelectric charging values and different conductivities.

PRIOR ART

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions is the appropriate triboelectric charging values associated therewith, as it is these values that enable continued constant developed images of high quality and excellent resolution.

Additionally, carrier particles for use in the development of electrostatic latent images are described in many patents including, for example, U.S. Pat. No. 3,590,000. These carrier particles may be comprised of various cores, including steel, with a coating thereover of fluoropolymers, and terpolymers of styrene, methacrylate, and silane compounds.

There is illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core. While the developer and carrier particles prepared in accordance with the process of this patent are suitable for their intended purposes, the conductivity values of the resulting particles are not constant in all instances, for example, when a change in carrier coating weight is accomplished to achieve a modification of the triboelectric charging characteristics; and further with regard to the '387 patent, in many situations carrier and developer mixtures with on y specific triboelectric charging values can be generated when certain conductivity values or characteristics are desired. With the invention of the present application, the conductivity of the resulting carrier particles can be substantially constant, and moreover, the triboelectric values can be selected to vary significantly, for example, from less than −30 microcoulombs per gram +70 microcoulombs per gram.

There is illustrated in U.S. Pat. Nos. 4,937,166 and 4,935,326, the disclosures of which are totally incorporated herein by reference, carriers containing a mixture of polymers, such as two polymers, not in close proximity in the triboelectric series. The appropriate components of these patents '166 and '326 such as the polymers, carrier cores and the like can be selected for the carriers of the present invention. Moreover, in U.S. Pat. No. 4,810,611, the disclosure of which is totally incorporated herein by reference, there is disclosed that there can be added to carrier coatings colorless conductive metal iodides in an amount of from about 25 to about 75 weight percent, such iodides including copper iodide, copper fluoride, and mixtures thereof. In the '611 patent, the conductivity ranges are considered relatively narrow, and the carrier tribocharge is not believed to be of a wide range, disadvantages overcome, or minimized with the present invention.

With further reference to the prior art, carriers obtained by applying insulating resinous coatings to porous metallic carrier cores using solution coating techniques may be undesirable from a number of viewpoints. For example, the coating material will usually reside in the pores of the carrier cores, rather than at the surfaces thereof, and, therefore, is not available for triboelectric charging wherein the coated carrier particles are mixed with finely divided toner particles. Attempts to resolve this problem by increasing the carrier coating weights, for example, to as much as 3 percent or greater to provide an effective triboelectric coating to the carrier particles involves handling excessive quantities of solvents, and further, usually these processes result in low product yields. Also, solution coated carrier particles, when combined and mixed with finely divided toner particles, provide in some instances triboelectric charging values which are too low for many uses. The powder coating processes overcome these disadvantages, and further enable developers that are capable of generating high and useful triboelectric charging values with finely divided toner particles; and also wherein the carrier particles are of substantially constant conductivity. Further, when resin coated carrier particles are prepared by powder coating the majority of the coating materials are fused to the carrier surface thereby reducing the number of toner impaction sites on the carrier material. Additionally, there can be achieved with carriers containing a dry mixture of polymers, such as PMMA (polymethyl methacrylate) and KYNAR® independent of one another, desirable triboelectric charging characteristics and conductivity values; that is, for example the triboelectric charging parameter is not dependent on the carrier coating weight as is believed to be the situation with the process of U.S. Pat. No. 4,233,387 wherein an increase in coating weight on the carrier particles may function to also permit an increase in the triboelectric charging characteristics.

Other U.S. Patents that may be of interest include U.S. Pat. No. 3,939,086, which illustrates steel carrier beads wiih polyethylene coatings, see column U.S. Pat. No. 6; 4,264,697, which discloses dry carrier coating and fusing processes; U.S. Pat. Nos. 3,533,835; 3,658,500; 3,798,167; 3,918,968; 3,922,382; 4,238,558; 4,310,611; 4,397,935; and 4,434,220, the disclosures of each of these patents being totally incorporated herein by reference.

Semisuspension polymerization processes are illustrated in U.S. Pat. Nos. 5,043,404, and 5,236,62, the disclosures of which are totally incorporated herein by reference. These semisuspension polymerization processes can be selected for the processes of the present invention.

More specifically disclosed in the aforementioned U.S. Pat. No. 5,043,404, is a semisuspension polymerization process for the preparation of small polymeric particles which are comprised of a mixture of monomer or comonomers, a polymerization initiator, a crosslinking component and a chain transfer component, which are bulk polymerized until partial polymerization is accomplished. The resulting partially polymerized monomer or comonomers is dispersed in water containing a stabilizer component with, for example, a high shear mixer, then the resulting suspension polymerized, followed by washing and drying the submicron polymeric particles. U.S. Pat. No. 5,236,629 discloses a process for the preparation of conductive submicron Polymeric particles which comprises mixing at least one monomer with a polymerization initiator, a crosslinking component and a chain transfer component; effecting bulk polymerization until from about 10 to about 50 weight, percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

Moreover, generally suspension polymerization processes are known, reference for example U.S. Pat. Nos. 3,243,419, and 4,071,670, the disclosures of which are totally incorporated herein by reference, and which suspension polymerizations can be selected for the processes of the present invention.

Emulsion polymerizations are illustrated in U.S. Pat. Nos. 4,486,559; 4,680,200; 4,702,988 and 5,153,286, the disclosures of each of these patents being totally incorporated herein by reference in their entireties.

The preparation of polymeric particles can be accomplished by grinding or attrition, and precipitation and in situ particle polymerizations. Grinding or attrition, especially fluid energy milling, of large polymeric particles or polymeric composite particles containing fillers of the size needed for powder coating, for example 1 to 5 microns, is often not desirable both from an economic and functional viewpoint. These particles are for example, difficult to grind and, therefore, grinding or attrition for coating with present milling equipment is costly primarily because of the very low processing yield, for example in the range of about 5 to 10 weight percent.

Precipitation processes can also be selected to prepare polymeric/polymeric composite particles. In one process, the polymer solution is heated to above its melting temperature and then cooled to form particles. In another process, the polymer solution is precipitated using a non-solvent, or the polymer solution is spray dried to obtain polymeric/polymeric composite particles. With these precipitation processes, it can be difficult to achieve low cost, pure polymer, that is, for example, with no or substantially no impurities, such as solvents or precipitants in the resulting polymer particles. It is also difficult with these processes to obtain particles with small particle size and narrow particle size distribution.

Also, the suspension polymerization of monomer is known for the formation of polymer/polymeric composite particles generally in a size range of about 200 microns and higher. The main advantage of suspension polymerization is that the product may easily be recovered, therefore, such a process is considered economical. However, it is very difficult by suspension polymerization to prepare very small part ices as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also, disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Moreover, disclosed in U.S. Pat. No. 4,835,084 is a method for preparing pigmented particles and wherein a high concentration of silica powder is used in the aqueous phase to prevent coalescence of the particles. There is also disclosed in U.S. Pat. No. 4,833,060 a process for the preparation of pigmented particles by dissolving polymer in monomer and dispersing in the aqueous phase containing silica powder to prevent coalescence of the particles. However the silica powder used in both U.S. Pat. Nos. '084 and '060 should be removed using for example potassium hydroxide, which is costly, and resicual potassium hydroxide and silica materials remaining on the surface adversely affects the charging properties of particles. There is disclosed in U.S. Pat. No. 3,954,898 a two step polymerization process for the preparation of a thermosetting finished powder. However, it is believed this process does not effectively enable synthesis of particles with a size less than about 100 microns.

SUMMARY OF THE INVENTION

It is a feature of the present invention to provide toner and developer compositions with carrier particles containing a polymer coating.

In another feature of the present invention there are provided dry coating processes for generating carrier particles of substantially constant conductivity parameters.

In yet another feature of the present invention there are provided dry coating processes for generating carrier particles of substantially constant conductivity parameters, and a wide range of pre-selected triboelectric charging values.

An important feature of the present invention resides in the provision of processes for the preparation of polymer carrier coatings, such as PMMA (polymethyl methacrylate).

In another feature of the present invention there are provided economical processes for the preparation of substantially pure, for example with a purity of from about 95 to about 99.95 percent, clean and dry small, for example from about 0.05 to about 5 microns in volume average diameter, polymeric particles, wherein product agglomeration is minimized, or avoided.

Another feature of the present invention resides in processes for generating submicron to micron sized polymeric composite particles with an average particle diameter size of from about 0.05 to about 5 microns.

In another feature of the present invention there are provided small polymeric particles that can be selected for two component carrier powder coatings, reference U.S. Pat. Nos. 4,937,166 and 4,935,326, the disclosures of which are totally incorporated herein by reference, and processes for preparing such carriers.

In another feature of the present invention there are provided simple processes for the formation of small polymeric particles, and more specifically from about 1 to about 5 micron size (volume average throughout) polymeric particles.

Another feature of the prevent invention resides in simple and economical polymerization processes for the preparation of low cost, clean, and dry small polymeric particles, and more specifically submicron or micron-size polymeric particles useful as carrier powder coatings.

Additionally, in another feature of the present invention there are provided, processes for the preparation of polymeric particles that can be selected for carrier powder coating with a triboelectric charge in the range, for example, of from about −30 to about +70, or from about −10 to about +40 microcoulombs per gram as determined by the known Faraday Cage process.

In embodiments of the present invention there are provided developer compositions comprised of toner, and carrier particles prepared by a powder coating process, and wherein the carrier particles are comprised of a core with a certain coatings thereover. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of a first polymer especially polymethyl methacrylate (PMMA), and which polymer optionally has dispersed therein carbon black or similar conductive components, and an optional second polymer, such as a fluoropolymer, like polyvinylidine fluoride, or KYNAR® until adherence thereof to the carrier core by mechanical impaction or electrostatic attraction; heating the resulting mixture of carrier core particles and polymer to a temperature, for example, of between about 200° F. and about 550° F. for an effective period of, for example, from about 10 minutes to about 60 minutes enabling the polymers to melt and fuse to the carrier core particles; cooling the coated carrier particles; and thereafter, classifying the obtained carrier particles to the desired particle size of, for example, from about 50 to about 200 microns in diameter.

Also, the present invention relates to a carrier with two polymers thereover, and preferably one polymer thereover selected in an amount of from about 1 to about 100 weight percent and wherein the second polymer when present is selected in an amount of from about 99 to about 0 weight percent, wherein the carrier core is a metal, a ferrite, a metal oxide, and the like such as known carrier cores, and wherein the polymer, such as polymethyl methacrylate is prepared by a suspension, or semisuspension processes wherein complexes are formed as illustrated herein.

The present invention in embodiments relates to a process for the preparation of polymers which comprises generating a solution of water and polyvinyl alcohol with acetate groups; adding thereto a mixture of an alkali metal iodide and iodine; adding thereto initiator, and optional crosslinking agent; adding monomer, a mixture of monomers, or a monomer/polymer mixture; homogenizing, and polymerizing; and wherein there is formed an iodide/iodine/acetate complex prior to said polymerizing; a process for the preparation of polymer which process comprises the mixing of an alkali metal iodide, iodine, a solution of water and polyvinyl alcohol with acetate groups, and monomer, comonomers or a monomer/polymer mixture, initiator, and an optional crosslinking agent; heating to polymerize and thereafter cooling, followed by isolating, washing and drying said polymer; a process wherein prior to heating to polymerize homogenizing is accomplished and wherein there is selected a mixture of monomer and polymer, the alkali metal iodide is potassium iodide, the polyvinyl alcohol possesses a hydroxyl number of from about 60 to about 98 and contains acetate groups thereon, and wherein an iodine/iodide/acetate complex forms between the potassium iodide, iodine, and said polyvinyl alcohol; a process wherein the water is present in an amount of from about 95 to about 99 percent and wherein there is selected a mixture of monomer and polymer, or a monomer; a process wherein heating to polymerize is from about 60 to about 150 degrees Centigrade, cooling is to a temperature of from about 20 to about 30 degrees Centigrade, isolating washing and drying is accomplished, and washing is accomplished with an aliphatic alcohol and water mixture to remove said polyvinyl alcohol, said iodine, and said alkali metal iodide, and wherein there is selected a mixture of monomer and polymer, or a monomer; a process wherein there is selected in place of said alkali metal iodide and said iodine, a mixture of a peroxide initiator and said alkali metal iodide; a process wherein there is selected in place of said alkali metal iodide and said iodine a mixture of a peroxide initiator and iodine; a process wherein the peroxide is benzoyl peroxide; a process wherein polymerization is accomplished by heating at a temperature of from about 60 to about 150 degrees Centigrade; a process wherein said potassium iodide is present in an amount of from about 0.1 to about 2 weight percent, and said iodine is present in an amount of from about 0.01 to about 0.1 weight percent; a process wherein there results a polymer product of polymethyl methacrylate by semisuspension polymerization which comprises: 1) forming an aqueous phase by mixing from about 95 to about 99 weight percent of water with from about 1 to about 5 weight percent polyvinyl alcohol, which alcohol has a degree of hydrolysis of from about 60 to about 98 percent, and adding: a) from about 0.1 to about 2 weight percent alkali metal iodide and from about 0.01 to about 0.1 weight percent iodine, or adding b) from about 0.1 to about 2 weight percent alkali metal iodide and from about 0.1 to about 5 weight percent peroxide initiator, or adding c) from about 0.01 to about 0.1 weight percent iodine and from about 0.1 to about 5 weight percent peroxide initiator, thus forming a complex; (2) forming an organic phase by mixing a monomer, comonomers, or a monomer:polymer mixture in a ratio of from about 100:0 to about 60:40, with an initiator in an amount of from about 1 to about 15 weight percent and an optional crosslinking agent from about 0 to about 5 weight percent; (3) thereafter mixing the aqueous and organic phases in a ratio of from about 10:90 to about 40:60 organic phase:aqueous phase, and homogenizing at a suitable speed of from about 1,000 to about 20,000 rpm with a high shear mixer; (4) subsequently heating the resulting mixture between from about 60° C. and about 150° C. until from about 80 to about 100 weight percent of monomer or comonomers has been polymerized; (5) cooling; (6) washing the mixture with a mixture of an aliphatic alcohol and water with a water:alcohol ratio of from about 10:90 to about 100:0, and wherein said washing is accomplished with a decanting centrifuge to thereby separate the wet cake, which is comprised of from about 50 weight percent solids, or polymer product and about 50 weight percent of liquid washing mixture; and (7) drying the wetcake to enable the polymer product; a process for the preparation of carrier which comprises (1) mixing carrier core with a mixture of a first and second polymer; (2) dry mixing the resulting carrier core for a sufficient period of time enabling the polymers to adhere to the carrier core; (3) subsequently heating the mixture of carrier core particles and polymer to a temperature of between about 200° F. and about 550° F., whereby the polymers melt and fuse to the carrier core; and (4) thereafter cooling the resulting coated carrier particles, and wherein the first polymer is obtained by the process of claim 2; a process wherein the carrier triboelectric charge is from about a minus 30 to about a positive 70 microcoulombs per gram; a carrier comprised of a core and thereover a coating of a first polymer obtained by the process of claim 2; a carrier further including a second polymer coating; a carrier wherein the second polymer is not in close proximity in the triboelectric series to the first polymer; a carrier wherein the second polymer is polyvinylidene fluoride; a process wherein said monomer is comprised of a mixture of comonomers; a process wherein the polyvinyl alcohol possesses a hydroxyl number or degree of hydrolysis of from about 75 to about 85; a process wherein a crosslinking agent is selected; a process wherein there is selected in an amount of from 0 to 5 weight percent a crosslinking agent; and from about 1 to about 15 weight percent initiator, or mixtures of initiators; a process wherein the polymer formed is polymethyl methacrylate; a semisuspension polymerization process for the preparation of polymer which comprises: 1) forming an aqueous phase by mixing water and polyvinyl alcohol, which polyvinyl alcohol contains acetate groups, and adding: a) iodine and an alkali metal iodide, or adding b) an alkali metal iodide and a peroxide initiator, or adding c) iodine and a peroxide initiator, thereby forming a complex; (2) forming an organic phase by mixing a monomer, comonomers, or a monomer:polymer mixture with an initiator and an optional crosslinking agent; (3) thereafter mixing the aqueous and organic phases and homogenizing; (4) subsequently heating the resulting mixture; (5) cooling; (6) washing the mixture with a mixture of an aliphatic alcohol and water; separating the wet cake and (7) drying the wetcake; a process which comprises mixing a solution of polyvinyl alcohol and which alcohol contains acetate groups, an alkali metal iodide, iodine, initiator, and monomer; polymerizing; a process wherein there is formed an iodide/iodine/acetate complex prior to polymerizing; said monomer is comprised of a mixture of monomers, or a monomer/polymer mixture; subsequent to said mixing homogenization is accomplished; and polymerizing is by heating; a process wherein a polymer results; a process wherein the ploymer is polymethyl methacrylate.

A polymer or polymers can be prepared in accordance with embodiments of the present invention by providing, or forming a mixture of water and polyvinyl alcohol, for example, about 60 to about 98, and preferably about 75 to about 85 percent hydrolyzed, that is the polyvinyl alcohol contains sufficient acetate groups thereon to enable it to form a complex; adding an alkali metal iodide, such as potassium iodide, and iodine thereby forming a complex between the acetates of the polyvinyl alcohol and the alkali metal iodide and the iodine, and which complex is usually red in color; adding, or mixing, i) monomer, such as methyl methacrylate monomer, or ii) one to five comonomers, preferably two, for example methyl methacrylate and acrylic acid, or iii) adding a mixture of monomer(s) and polymer(s), for example about 70 to 95 weight percent monomer such as methyl methacrylate and about 5 to about 30 weight percent polymer such as polymethyl methacrylate; homogenizing the resulting mixture, and thereafter polymerizing, preferably by suspension polymerization or semisuspension polymerization and which polymerization involves heating; cooling; separating the polymer product; washing and drying, the washing being accomplished primarily to remove residual polyvinyl alcohol. In place of the alkali metal iodide and iodine the re may be selected for the processes of the present invention in embodiments thereof a mixture of an initiator, such as a peroxide, like benzoyl peroxide, and iodine, or a mixture of alkali metal iodide and an initiator such a 3 benzoyl peroxide, or other similar suitable peroxide.

The suspension process can be accomplished by: 1) forming an aqueous phase by for example, mixing about 95 to about 99 weight percent, or parts of water with about 1 to about 5 weight percent of polyvinyl alcohol which has a degree of hydrolysis between about 60 and 98 percent, and preferably between about 75 and about 85 percent, and adding a) from about 0.1 to about 2 weight percent of alkali metal iodide and about 0.01 to about 0.1 weight percent iodine, or b) from about 0.1 to about 2 weight percent alkali metal iodide and about 0. 1 to about 5 weight percent peroxide initiator, or c) from about 0.01 to about 0.1 weight percent iodine and about 0.1 to about 5 weight percent peroxide initiator, thus forming a complex in a), b) or c), that is an iodine-iodide-acetate complex, which acetate is contained on the polyvinyl alcohol, and which complex is usually red in color; (2) forming an organic phase by mixing a monomer or comonomers, or a monomer:polymer mixture (ratio of from about 100:0 to about 60:40), with an initiator or initiators, from about 1 to about 15 weight percent, and an optional crosslinking agent, which agent functions primarily to strengthen the resulting polymer, and which agent is selected for example, in an amount of from is about 0 to about 5 weight percent; (3) fixing the resulting phases together in a ratio of from about 10:90 to about 40:60 organic phase:aqueous phase, and homogenizing at a suitable speed, for example, from about 1,000 to about 20,000 rpm, and preferably from about 5,000 to about 12,000 rpm with a high shear mixer such as a Brinkmann Polytron; (4) heating the mixture resulting, for example, to between about 45° C. and about 120° C. (Centigrade) until from about 80 to about 100 weight percent of monomer or comonomers has been polymerized; (5) cooling to about room temperature; (6) washing the mixture with for example a mixture of an aliphatic alcohol such as methanol and water, water:alcohol ratio between about 10:90 and about 100:0, using a decanting centrifuge for each washing stage to separate the wet cake, which is comprised of for ex ample, about 50 weight percent solids (polymer product) and about 50 weight, percent liquid (washing mixture), and using for example from about two to about six washing stages; and (7) drying the separated wetcake to enable the polymer product.

The invention polymerization process possesses improvements over other suspension or semisuspension polymerization processes by eliminating undesirable foam and fouling in the polymerization reactor. When the aforementioned red complex is observed, no reactor foaming or fouling are observed. When the red complex is not observed, major foaming and fouling occurs in the reactor. Thus, antifoaming agents which may affect product properties or be difficult to remove are not needed.

Illustrative examples of monomer, or comonomers, that is for example, mixtures of monomers, from one to about five for example, present in an amount of, for example, from about 80 to about 99 weight percent, and more preferably from about 80 to about 90 weight percent include vinyl monomers comprised of styrene and its derivatives such as styrene, ($\alpha$-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, dimethylaminoethyl methacrylate, diethylaminoethyl methacrylate, diisopropylaminoethyl methacrylate, tert-butylaminoethyl methacrylate, glycidyl methacrylate, acrylonitrile, acrylamide, dimethylacrylamide, and isopropylacrylamide; dicarboxylic acids with a double bond and its derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene ; unsaturated mono-olefins such as isobutylene and the like; vinylidene halides such as vinylidene chloride and the like; N-vinyl compounds such as N-vinyl pyrrole and fluorinated monomers such as pentafluoro styrenes, allyl pentafluorobenzene and the like; and mixtures thereof. Preferably or e monomer is selected; for mixtures various suitable amounts of each comonomer can be selected, for example from about 1 to about 99, preferably from about 40 to about 65 percent by weight, or parts, of a first monomer, and from about 1 to about 99, and preferably from about 60 to about 35 percent by weight, or parts of a second comonomer, and wherein the total for the two comonomers is about 100 parts, or 100 percent. Other known monomers may be selected.

Illustrative examples of polymerization initiators present in an amount of, for example, from about 0.1 to about 20 weight percent of monomer, and more preferably from about 1 to about 5 weight percent include azo compounds such as 2,2'-azobis(2,4-dimethyl valeronitrile), 2,2'-azobis(2-methyl butyronitrile), of 1,1'-azobis(cyanocyclohexane), and the like, and peroxides such as benzoyl peroxide, lauryl peroxide, 1-1-(t-butylperoxy)-3,3,5-trimethylcyclohexane, n-butyl-4,4-di-(t-butylperoxy) valerate, dicumyl peroxide and the like. For the mixtures from 2 to about 5 initiators can be selected, and preferably 2 initiators, and wherein the amounts of each initiator can vary, providing the total thereof is about 100 percent. For example, from about 1 to about 99 parts, or weight percent of a first initiator, and from about 99 to about 1 parts, or weight percent of a second different initiator can be selected, with preferred amounts in embodiments being for example from about 40 to about 60 for one initiator, and from about 60 to about 40 for the second dissimilar initiator.

Crosslinking agents selected for the process of the present invention are known and can be comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; and divinyl compounds such as divinyl ether, divinyl sulfite, divinyl sulfone and the like, such as other known crosslinking agents. Among these, divinylbenzene is particularly useful. The crosslinking component, or compound is preferably present in an amount of from about 0.1 to about 5 parts by weight in 100 parts and, more preferably, from 0.2 to 1 part by weight of the monomer or comonomers.

Various polymerizations illustrated herein can be selected to convert monomers and the like to polymers, and more specifically polymerization is accomplished by heating such as by heating the reaction mixture at a temperature of from about 60 to about 150 degrees centigrade. Isolating, washing, and drying of the product can be accomplished by a number of known methods. For example isolation can be effected by filtration, drying by heating or with an oven dryer, and washing by mixing. Various washing components can be selected as indicated herein, such as water, aliphatic alcohols, mixtures thereof, and the like. Examples of alcohols include those with from about 1 to about 25 and preferably from 1 to about 12 carbon atoms, such as methanol, ethanol, propanal, butanol and the like.

Examples of alkali metal odides are compounds of ammonium iodide, barium iodide, calcium iodide, cuprous iodide, lithium iodide, potassium iodide, sodium iodide, and the like, and the amount of alkali metal iodide selected can vary, and more specifically is preferably for example, from about 0.1 to about 2 weight percent based on the weight of water selected for the reaction, or reaction mixture.

Examples of products generated with the processes of the present invention, and with a size diameter range of for example, from about 0.05 to about 5 microns, and preferably from about 1 to about 5 microns include polymethyl methacrylate (PMMA), polystyrene, poly-$\alpha$-methylstyrene, poly-p-chlorostyrene and the like; monocarboxylic acid polymers and their derivatives such as polyacrylic acid, polymethyl acrylate, polyethyl acrylate, polybutyl acrylate, polydodecyl acrylate, polyoctyl acrylate, polyphenyl acrylate, polymethacrylic acids, polyethyl methacrylate, polybutyl methacrylate, polyoctyl methacrylate, polydimethylaminoethyl methacrylate, polydiethylaminoethyl methacrylate, polydiisopropylaminoethyl methacrylate, polytertbutylaminoethyl methacrylate, polyglycidyl methacrylate, polyacrylonitrile, polyacrylamide, polydimethylacrylamide, and polyisopropylacrylamide; polymers from dicarboxylic acids with a double bond and their derivatives such as polymaleic acid, polymonobutyl maleate, and polydibutylmaleate; polymers obtained from vinyl esters such as polyvinyl chloride, polyvinyl acetate and polyvinyl benzoate; polymers obtained from vinyl ketones such as polyvinyl methyl ketone and polyvinyl ether ketone; and polyvinyl ethyl ether and polyvinyl isobutyl ether; polyvinyl naphthalene; polymers from unsaturated mono-olefins such as polyisobutylene and the like; vinylidene halides such as polyvinylidene chloride and the like; N-vinyl compounds such as poly-N-vinyl pyrrole and fluorinated polymers such as polypentafluoro styrene, polyallyl pentafluorobenzene and the like; and mixtures thereof.

Various suitable solid core carrier materials can be selected for the carriers and developers of the present invention. Characteristic core properties of importance include those that will enable the toner particles to acquire a positive charge or a negative charge, and carrier cores that will permit desirable flow properties in the developer reservoir present in the xerographic imaging apparatus. Also of value with regard to the carrier core properties are, for example, suitable magnetic characteristics that will permit magnetic brush formation in magnetic brush development processes; and also wherein the carrier cores possess desirable mechanical aging characteristics. Examples of carrier cores that can be selected include iron, steel, ferrites such as Sr (strontium)-ferrite, Ba-ferrite, Cu/Zn-ferrite, and Ni/Zn-ferrite, magnetites, nickel, mixtures thereof, and the like. Preferred carrier cores include ferrites, and sponge iron, or steel grit with an average particle size diameter of from between about 30 microns to about 200 microns, and preferably from about 65 lo about 120 microns, as determined for example, by a Coulter Counter device.

The first polymer coating, such as polymethyl methacrylate, prepared as illustrated herein, and which optionally has dispersed therein conductive components, such as metal oxides like tin oxide, conductive carbon blacks, and the like, in effective amounts of, for example, from about 1 to about 70 and preferably from about 15 to about 50 weight percent can be applied to the carrier core by various methods, such as the dry processes as illustrated herein. This polymer (an be selected as the only carrier coating. In embodiments there is preferably selected a mixture of carrier coatings, such as a mixture of polymethyl methacrylate and a second polymer not in close proximity in the triboelectric series, such as KYNAR®, reference U.S. Pat. Nos. 4,937,166, and 4,935,326, the disclosures of each patent being totally incorporated herein in their entireties. The first polymer such as polymethyl methacrylate is selected in various effective suitable amounts, for example from about 1 to about 100 percent by weight, from about 1 to about 99 weight percent, and preferably from about 40 to about 60 weight percent, with a second polymer, when selected being present in amounts of from about 1 to about 99 weight percents, are preferably from about 40 to about 60 weight percent. The weight percents are based primarily on the amount of carrier core and carrier coating totals.

With the mixture of two polymers, there are enabled the advantages of wide ranges of carrier triboelectric charging values and carrier conductivity as indicated herein and for example, carrier triboelectric values of from about −30 to about +50 microcoulombs per gram, or from about −10 to about +40 microcoulombs per gram depending on the relative ratios of the two polymers used, and conductivities greater than about, or about equal $5 \times 10^{-10}$ mhos per centimeter and more specifically from about $10^{-6}$ to about $10^{-17}$ mhos per centimeter.

The process for incorporating these polymers onto a carrier core can be sequential, a process in which one of the two polymers is fused to the surface in a first step and the second polymer is fused to the surface in a subsequent fusing step. Alternatively, the process for incorporation can comprise a single fusing step in which the two polymers, which are mixed with each other prior to the fusing process, are incorporated onto the core in a single fusing step.

Also, the carrier coating can have incorporated therein various charge enhancing additives, which additives can function to primarily increase the carrier triboelectric charge, for example in excess of up to about 40 to about 50 microcoulombs per gram as determined by the known Faraday Cage method, or a carrier tribo of up to about 70 microcoulombs per gram, and which additives include for example, quaternary ammonium salts, and more specifically, distearyl dimethyl ammonium methyl sulfate (DDAMS), bis[1-[(3,5-disubstituted-2-hydroxyphenyl)azo]-3-(mono-substituted)-2-naphthalenolato(2-)]chromate(1-), ammonium sodium and hydrogen (TRH), cetyl pyridinium chloride (CPC), FANAL. PINK® D4830, and the like, including those as specifically recited in the patents mentioned herein, and other effective known charge agents or a additives. The charge additives are selected in various effective amounts, such as from about 0.05 to about 15, and preferably from about 1 to about 3 weight percent.

Examples of first and second polymers selected include polymethyl methacrylate, polyvinylidenefluoride, polyvinylfluoride, polypentafluorostyrene, polyethylene, polymethylmethacrylate, copolyethylenevinylacetate, copolyvinylidenefluoride tetrafluoroethylene, and polyethylene; polymethylmethacrylate, polyurethane and copolyethylene, and preferably wherein the first and second polymers are dissimilar, and wherein the first polymer, such as polymethyl methacrylate is obtained by the processes illustrated herein. Other known related polymers not specifically mentioned herein may also be selected, such as those illustrated in the U.S. Pat. Nos. 4,937,166 and 4,935,326 patents mentioned herein.

Various effective suitable processes can be selected to apply the polymer, or mixture of polymer coatings to the surface of the carrier particles. Examples of typical processes for this purpose include combining the carrier core material, and the polymers by cascade roll mixing, or tumbling, milling, shaking, electrostatic powder cloud spraying, fluidized bed, electrostatic disc processing, and an electrostatic curtain. Following application of the polymers, heatings initiated to permit flowout of the coating material over the surface of the carrier core. The concentration of the coating material powder particles, and the parameters of the heating step, may be selected to enable the formation of a continuous film of the coating polymers on the surface of the carrier core, or permit only selected areas of the carrier core to be coated. When selected areas of the metal carrier core remain uncoated or exposed, the carrier particles will possess electrically conductive properties when the core material comprises a metal. The aforementioned conductivities can include various suitable values. Generally, however, this conductivity is from about $10^{-9}$ to about $10^{-17}$ mho-cm$^{-1}$ as measured, for example, across a 0.1 inch magnetic brush at an applied potential of 10 volts; and wherein the coating coverage encompasses from about 10 percent to about 100 percent of the carrier core.

Illustrative examples of toner resins selected for the toner which when admixed with carrier generates developer compositions includes a number of binders, such as thermoplastics, such as polyamides, epoxies, polyurethanes, diolefins, vinyl resins, polyesters, such as those obtained by the polymeric esterification products of a dicarboxylic acid and a diol comprising a diphenol, reactive extruded polyesters, reference U.S. Pat. No. 5,376,494, the disclosure of which is totally incorporated herein by reference. Specific vinyl monomers that can be used are styrene, p-chlorostyrene vinyl naphthalene, unsaturated monoolefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether; vinyl ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidene; styrene butadiene copolymers; mixtures thereon; and other similar known resins.

As one toner resin there can be selected the esterification products of a dicarboxylic acid and a diol comprising a diphenol, reference U.S. Pat. No. 3,590,000, the disclosure of which is totally incorporated herein by reference. Other preferred toner resins include styrene/methacrylate copolymers; styrene/butadiene copolymers; styrene acrylates; polyester resins obtained from the reaction of biphenol A and propylene oxide; and branched polyester resins resulting from the reaction of dimethyl terephthalate, 1,3-butanediol, 1,2-propanediol and pentaerythritol.

Generally, from about 1 part to about 5 parts by weight of toner particles are mixed with from about 10 to about 300 parts by weight of the carrier particles.

Numerous well known suitable colorants, such as pigments, dyes, or mixtures thereof, or mixtures of pigments, mixtures of dyes, and the like, and preferably pigments can be selected as the colorant for the toner particles including, for example, carbon black, nigrosine dye, lamp black, iron oxides, magnetites, and mixtures thereof. The colorant which is preferably carbon black, cyan, magenta, yellow, or mixtures thereof, should be present in a sufficient amount to render the toner composition highly colored. Thus, the pigment is present in amounts of from about 1 percent by weight to about 20, and preferably from about 5 to about 12 percent by weight, based on the total weight of the toner composition, however, lesser or greater amounts of pigment may be selected.

When the colorant particles are comprised of magnetites, which are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 20 percent by weight to about 50 percent by weight.

The toner resin particles are present in a sufficient, but effective amount, thus when 10 percent by weight colorant, such as carbon black like REGAL 330®, is contained therein, about 90 percent by weight of resin is selected. The toner composition is for example, comprised of from about 85 percent to about 97 percent by weight of toner resin particles, and from about 3 percent by weight to about 15 percent by weight of pigment particles such as carbon black.

Also, there may be selected colored toner compositions comprised of toner resin particles, carrier particles and as pigments or colorants, magenta, cyan and/or yellow particles, and mixtures thereof. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Irdex as Foron Yellow SE/GLN, CI Dispersed Yellow 33, 2,5-dimethoxy-4-sulfonanilide phenylazo-4'-chloro-2,5-dimethoxy acetoacetanilide, permanent yellow FGL, and the like. These colorants are generally present in the toner composition in an amount of from about 1 weight percent to about 15, and preferably from about 2 to about 10 weight percent based on the weight of the toner resin particles.

Examples of other colorants are known, reference for example U.S. Pat. No. 5,556,727, the disclosure of which is totally incorporated herein by reference.

For further enhancing the positive charging characteristics of the developer compositions described herein, and as optional components there can be incorporated therein with respect to the toner charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; U.S. Pat. No. 4,560,635, the disclosure of which is totally incorporated herein by reference; sulfates such as distearyldimethylammonium bisulfate, and the sulfates of U.S. Pat. No. 4,904,762, and other similar known charge enhancing additives. These additives are usually incorporated into the toner in an amount of from about 0.1 percent by weight to about 20, and preferably from about 1 to about 5 percent by weight. The charge additive 3 can also be dispersed in the carrier polymer coating as indicated herein.

The toner compositions can be prepared by a number of known methods including melt blending the toner resin particles, and colorant, such as pigment particles followed by mechanical attrition, emulsion/aggregation, and the like. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product. Toner sizes can vary, for example from 1 to about 25, and preferably from about 7 to about 15 microns in volume average diameter.

The toner and developer compositions may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. Nos. 4,265,990; 4,585,884; 4,584,253; 4,563,408; and 5,645,965, the disclosures of which are totally incorporated herein by reference, and other similar layered photoresponsive device. Examples of generating layers are trigonal selenium, metal phthalocyanines, metal free phthalocyanines, hydroxy gallium phthalocyanines, titanyl phthalocyanines, perylenes, and vanadyl phthalocyanines. As charge transport molecules there can be selected the aryl diamines disclosed in the '990 patent.

Images obtained with this developer composition had acceptable solids, excellent halftones, and desirable line resolution with acceptable or substantially no background deposits.

The following Examples are being provided to further illustrate the present invention. Comparative Examples and data are also provided. Parts and percentages are by weight unless otherwise indicated.

EXAMPLES

1. Semisuspension Polymerization

In a 500 mL glass reactor, 114 g (grams) of methyl methacrylate (MMA), 0.75 g of divinylbenzene (dvb) crosslinking agent, and 28 grams of Elvacite-2008 polymethyl nethacrylate were stirred at 210 rpm overnight, about 18 hours. Initatiators, 4.9 g (grams) of Vazo-52, which is (2,2'-azobis(2,4-dimethylvaleronitrile), 2.5 g of Vazo-67, which is (2,2'-azobis(2-methylbutyronitrile), and Lucidol 75 benzoyl peroxide (BPO) (see Table 1 below for quantities) were added the next morning, about 18 hours later. This resulting organic phase was stirred for 1 hour to dissolve the initiators. An aqueous phase mixture of 11.44 g Airvol 603 polyvinyl alcohol obtained from Air Products, and which polyvinyl alcohol is 80% hydrolyzed (20% acetate groups), potassium iodide (KI) and iodine (12) (see Table 1 below for quantities) in 458.56 g deionized water was stirred at 350 rpm in a 2 L stainless steel beaker. A red colored complex was observed in the aqueous phase for combinations of KI/I$_2$/BPO (see Table 1). The above organic phase was poured into the aqueous phase, and the resulting slurry was mixed for about 3 minutes. The slurry was then homogenized in an ice bath at 8,000 rpm for 5 minutes using a Brinkmann Polytron homogenizer. The resulting slurry was poured into a 1 L Parr reactor that was then sealed and pressurized to 100 kPa with nitrogen. Stirring was started in the reactor at 230 rpm with a pitch blade impeller. The reactor was heated to 60° C. for 90 minutes and then to 80° C. for 90 minutes, and was then cooled by removing the heat source. The final slurry was washed by dispersing it in 420 g of methanol and 50 g of deionized water (DIW), followed by centrifugation and decanting of the the centrate. The resulting wet cake was then redispersed in methanol/DIW a; above and the centrifugation was repeated. This cycle was repeated four times, and then a final wash step was accomplished using 480 g DIW. The excess water was then dried off in an oven at 80° C., and the product of polymethyl methacrylate (about 99.5 percent pure) was ground in a coffee grinder, and vacuum drying was accomplished at 80° C. for 4 hours to complete the drying step.

Particle size of the final product was measured on a Coulter LS230 laser diffraction device. No foam, fouling, and minimal fouling, was determined by visual observation.

TABLE 1

| Expt. # | Formulation | | | Particle Size (Coulter LS 230) | | Red Complex Observed in Aqueous Phase | Notes |
|---|---|---|---|---|---|---|---|
| | KI (g) | I$_2$ (g) | BPO (g) | Median ($\mu$m) | % >10 ($\mu$m) | | |
| 1 | 5 | 0.15 | 3.1 | 5.35 | 40.5 | Yes | No foam; minimal fouling |
| 2 | 5 | 0.15 | 0 | 2.54 | 0 | Yes | No foam; minimal fouling |
| 3 | 5 | 0 | 3.1 | 2.69 | 4.24 | Yes | No foam; minimal fouling |
| 4 | 5 | 0 | 0 | 2.44 | 0 | No | Major foaming and fouling |
| 5 | 0 | 0.15 | 3.1 | 2.36 | 0 | No | No foam; minimal fouling |
| 6 | 0 | 0.15 | 0 | 2.14 | 0 | No | Major foaming and fouling |
| 7 | 0 | 0 | 3.1 | 2.76 | 3.03 | No | Major foaming and fouling |
| 8 | 0 | 0 | 0 | 2.39 | 0.26 | No | Major foaming and fouling |

The results in Table 1 indicate that at least three combinations eliminating foaming and fouling in the reaction: (1) KI and I$_2$, or (2) KI and BPO, or (3) BPO and I$_2$. A red colored complex (an iodine/iodide/acetate complex) was observed in the aqueous phase when these combinations were present. There is no red colored complex observed with the other combinations, and large amounts of foaming and fouling are present in the mixture.

Three of the above prepared polymers were tested as carrier coatings as shown in Table 2. Carriers were prepared in 5" kiln inserts, and which carriers were comprised of Nuclear Metals 100 $\mu$m diameter core and 1% coating weight of the aforementioned polymethyl methacrylate, PMMA prepared by the invention process. The core and polymers were mixed in an M5R blender (30 min @ 50 rpm, 10 lb. loading) and fused (30 min. residence time) at 400° F. Developers were prepared by mixing 194 grams of the above carrier with 6 grams of a toner composition comprised of 87 percent by weight of a 30 percent (by weight) gel content partially crosslinked polyester resin, obtained by the reactive extrusion of a linear polyester, 5 percent by weight of carbon black, 4 percent by weight of a polypropylene wax, and 4 percent by weight of a compatibilizing agent comprised of KRATON™ (a styrene-ethylene/butylene-styrene block copolymer) obtained from Shell Chemicals.

Thereafter, the triboelectric charge on the carrier particles was determined by the known Faraday Cage process, and voltage breakdown (Vb) was measured by forming a 0.1 inch long magnetic brush and measuring the voltage needed to produce a potential difference of 10 Volts across a resistor. The results are shown in Table 2.

TABLE 2

| Experiment # | Vb (V) | Tribo (μC/g) |
|---|---|---|
| 3 | >1500 | 22.2 |
| 1 | >1500 | 21.4 |
| 2 | >1500 | 24.0 |

The resulting carriers had a voltage breakdown greater than 1,500 volts which indicates excellent surface coverage for the coating.

2. Suspension Polymerization

Four of the above experiments were repeated without using Elvacite 2008 polymethyl methacrylate (DuPont) in the organic phase:

In a 500 mL glass reactor 140 g MMA (methyl methacrylate), 0.75 g dvb, 604 g of Vazo-52, 2,2'-azobis(2,4-dimethylvaleronitrile), 3.02 g of Vazo-67 (2,2'-azobis(2-methylbutyronitrile) and Lucidol-75 BPO (see Table 1 for quantity) were stirred at 210 rpm or 30 minutes to create an organic phase.

More specifically in a 500 mL glass reactor, 140 g methyl methacrylate (MMA) and 0.75 g divinylbenzene (dvb) crosslinking agent were stirred at 210 rpm for 30 minutes. 6.04 Grams Vazo-52, 3.02 g Vazo-67, and Lucidol 75 benzoyl peroxide (see Table 3 below for quantities) initiators were added, and this organic phase was stirred for 1 hour to dissolve the initiators. An aqueous phase mixture of 11.44 g Airvol 603 polyvinyl alcohol obtained from *Air Products*, and which alcohol is 80% hydrolyzed (i.e., 20% acetate groups), potassium iodide (KI) and iodine ($I_2$) (see Table 3 below for quantities) in 453.56 g deionized water was stirred at 350 rpm in a 2 L stainless steel beaker The organic phase was poured into the aqueous phase and the resulting slurry was mixed for about 3 minutes. The mixture was then homogenized in an ice bath at 8,000 rpm for 5 minutes using a Brinkmann Polytron homogenizer. The resulting slurry was poured into a 1 L Parr reactor that was then sealed and pressurized to 100 kPa with nitrogen. Stirring was started at 230 rpm. The reactor was heated to 60° C. for 90 minutes and then to 80° C. for 90 minutes, and was then cooled. The final slurry was washed by dispersing it in 420 g methanol and 50 g DIW, followed by centrifugation and decanting of the centrate. The resulting wet cake was then redispersed in methanol/DIW as above and the centrifugation was repeated. This cycle was repeated four times, and then a final wash step was accomplished using 480 g DIW. The excess water was then dried off in an oven at 80° C., the product was ground in a coffee grinder, and vacuum drying was done at 80° C. for 4 hours to complete the drying step.

Particle size of the final polymethyl methacrylate product (about 99.5% pure) was measured on a Coulter LS230 laser diffraction device.

TABLE 3

| | Formulation | | | Particle Size (Coulter LS 230) | | |
|---|---|---|---|---|---|---|
| Expt. # | KI (g) | $I_2$ (g) | BPO (g) | Volume Median (μm) | % >10 (μm) | Notes |
| 9 | 5 | 0.15 | 3.1 | 1.78 | 0.05 | No foam; minimal fouling |
| 10 | 0 | 0.15 | 3.1 | 2.57 | 3.78 | No foam; minimal fouling |
| 11 | 5 | 0.15 | 0 | 2.25 | 0 | No foam; minimal fouling |
| 12 | 0 | 0 | 0 | 2.70 | 3.67 | Major foaming and fouling |

Other modifications of the present invention may occur to those of ordinary skill in the art subsequent to a review of the present application, and these modifications, including equivalents thereof, are intended to be included within the scope of the present invention.

What is claimed is:

1. A process for the preparation of carrier which comprises (1) mixing carrier core with a mixture of a first and second polymer; (2) dry mixing the resulting carrier core for a sufficient period of time enabling the polymers to adhere to the carrier core; (3) subsequently heating the mixture of carrier core particles and polymer to a temperature of between about 200° F. and about 550° F., whereby the polymers melt and fuse to the carrier core; and (4) thereafter cooling the resulting coated carrier particles, and wherein the first polymer is prepared by the mixing of an alkali metal iodide, iodine, a solution of water and polyvinyl alcohol with acetate groups, and monomer, comonomers or a monomer/polymer mixture, initiator, and an optional crosslinking agent; heating to polymerize and thereafter optionally cooling, isolating, washing and drying said polymer.

2. A process in accordance with claim 1 wherein the carrier triboelectric charge is from about a minus 30 to about a positive 70 microcoulombs per gram.

3. A carrier comprised of a core and thereover a coating of a first polymer which polymer is prepared by the mixing of an alkali metal iodide, iodine, a solution of water and polyvinyl alcohol with acetate groups, and monomer, comonomers or a monomer/polymer mixture, initiator, and an optional crosslinking agent; heating to polymerize and thereafter optionally cooling, isolating, washing and drying said polymer.

4. A carrier in accordance with claim 3 and further including a second polymer coating.

5. A carrier in accordance with claim 4 wherein the second polymer is not in close proximity in the triboelectric series to the first polymer.

6. A carrier in accordance with claim 5 wherein the second polymer is polyvinylidene fluoride.

7. A carrier in accordance with claim 3 wherein prior to heating to polymerize homogenizing is accomplished and wherein there is selected a monomer or a mixture of monomer and polymer, the alkali metal iodide is potassium iodide, the polyvinyl alcohol possesses a hydroxyl number of from about 60 to about 98 and contains acetate groups thereon, and wherein an iodine/iodide/acetate complex forms between the potassium iodide, iodine, and said polyvinyl alcohol.

8. A carrier in accordance with claim 3 wherein the water is present in an amount of from about 95 to about 99 percent and wherein there is selected a mixture of monomer and polymer, or a monomer.

9. A carrier in accordance with claim 3 wherein heating to polymerize is from about 60 to about 150 degrees Centigrade, cooling is to a temperature of from about 20 to about 30 degrees Centigrade, isolating washing and drying is accomplished, and washing is accomplished with an aliphatic alcohol and water mixture to remove said polyvinyl alcohol, said iodine, and said alkali metal iodide, and wherein there is selected a mixture of monomer and polymer, or a monomer.

10. A carrier in accordance with claim 3 wherein there is selected in place of said alkali metal iodide and said iodine, a mixture of a peroxide initiator and said alkali metal iodide.

11. A carrier in accordance with claim 3 wherein there is selected in place of said alkali metal iodide and said iodine a mixture of a peroxide initiator and iodine.

12. A process in accordance with claim 1 wherein the initiator is a peroxide.

13. A process in accordance with claim 7 wherein polymerization is accomplished by heating at a temperature of from about 60 to about 150 degrees Centigrade.

14. A process in accordance with claim 7 wherein said potassium iodide is present in an amount of from about 0.1 to about 2 weight percent, and said iodine is present in an amount of from about 0.01 to about 0.1 weight percent.

* * * * *